3,122,523
FORMALDEHYDE-KETONE RESINS OF INCREASED MELTING POINT
Friedrich Josten, Utfort, Moers, Germany, assignor to Rheinpreussen Aktiengesellschaft für Bergbau und Chemie, Homberg, Lower Rhine, Germany, a corporation of Germany
No Drawing. Filed Dec. 22, 1958, Ser. No. 782,319
Claims priority, application Germany Dec. 28, 1957
7 Claims. (Cl. 260—64)

This invention relates to the production of formaldehyde-ketone resins of high melting point.

It is known that formaldehyde can be condensed with ketones in the presence of an alkali condensing agent so as to form light colored, readily soluble synthetic resins. As ketones, aliphatic ketones with 3–5 carbon atoms are used. The alkali condensing agent consists of alkali metal hydroxides, especially of an aqueous solution of sodium hydroxide. The condensation of formaldehyde with an aliphatic ketone can be effected in an one-stage-reaction, but also in two or more stages. Especially good ketone resins are obtainable according to the method described in German Patent 850,232. By this method, an aliphatic ketone with 3–5 carbon atoms is condensed with formaldehyde in the presence of an alkali condensing agent at low temperatures between room temperature and 30° C. so that only a slight precondensation takes place; thereupon the reaction mixture is neutralized by the addition of a mineral or organic acid, such as hydrochloric acid, sulfuric acid or acetic acid, and the reaction mixture is heated to about 70 to 80° C., whereupon aqueous alkali hydroxide solution and formaldehyde are again added. Depending on the nature and the molar ratio of ketone to formaldehyde, resins of different melting point are obtained. For instance, with a ratio of 1 mol methylethyl ketone to 3 mols formaldehyde, there is obtained a resin having a Krämer-Sarnow [1] melting point of 115 to 120° C., and with a ratio of 1 mol methylethyl ketone to 2 mols formaldehyde, a resin having a melting point of 85 to 90° C.

The resin yields decrease with increasing melting point or with increasing the ratio of formaldehyde in the reaction mixture. For instance, the yield in the case of a molar ratio of ketone to formaldehyde of 1:2.4 is 65%. At a ratio of 1 mol of ketone to 3 mols of formaldehyde, there is obtained a yield of only 55 to 57%.

The aforementioned formaldehyde-ketone resins are known per se and do not fall into the scope of the invention. In the following description, these known synthetic resins are named ketone resins.

It has now been found that synthetic formaldehyde ketone resins of especially high melting point are maintained if the aforenamed ketone resins are reacted with quantities of α-β-ethylene dicarboxylic acids or their anhydrides not in excess of about 10 weight-% at temperatures between 160 and 250° C. and preferably 200 and 220° C. The condensation products of aliphatic ketones and formaldehyde still contain double bonds and also hydroxyl groups which are capable of esterification so that upon reaction with α-β-ethylene dicarboxylic acids, such as fumaric acid, maleic acid, citraconic acid, mesaconic acid or itaconic acid, strong cross-linking reactions take place. By the polymerizing condensation of these ketone resins with the aforementioned unsaturated dicarboxylic acids, for instance fumaric acid, it is possible to obtain melting point increases of about 40° C. with relatively small additions of for instance 2% by weight of fumaric acid. When using 10% by weight fumaric acid, the melting point of a ketone resin rises from 87 to 160° C. Saturated dicarboxylic acids, such as phthalic anhydride for instance, give practically no increase in the melting point and supply resins of very dark color. Similarly the action of monocarboxylic acids on ketone resins results in only a slight increase in the melting point; for instance, when using 10% by weight of crotonic acid, there is obtained a melting point increase of only 10° C.

Accordingly, the invention provides a novel method for synthetic resin production and novel synthetic resins. The method involves contacting a resin derived from the condensation of formaldehyde and an aliphatic ketone with 3–5 carbon atoms, which can conveniently be called a precursor resin, with an α-β-ethylene dicarboxylic acid at a temperature of 160 to 250° C., the contacting being for a time sufficient to react the precursor resin and the unsaturated dicarboxylic acid to form a synthetic resin of substantially higher melting point than that of the precursor resin.

The precursor resin is desirably formed from a lower aliphatic ketone with 3–5 carbon atoms such as acetone, methylethyl ketone, methylpropyl ketone or diethyl ketone, and formaldehyde. As unsaturated dicarboxylic acids there can be used ethylenically unsaturated acids which have been mentioned hereinbefore.

Conveniently, the contacting of precursor resin and unsaturated dicarboxylic acid at elevated temperatures is carried out in the presence of an organic solvent which forms an azeotropic mixture with water. Thus, water is azeotropically distilled off from the reaction mixture. Suitable organic solvents are xylene, toluene or benzene.

Appropriately, the reaction of precursor resin and unsaturated dicarboxylic acid according to the invention can be coupled with the method of German Patent 850,232 to provide improved production means for resins of the ketone-formaldehyde condensation type. Thus, as in the method of the aforementioned patent yields decrease with increasing softening points, improved results can be realized, where, for example, it is desired to make a resin of a particular melting point, by producing at high yields a resin of lower melting point than the specified melting point and then treating the resulting resin with unsaturated dicarboxylic acid according to the invention to bring the melting point up to the desired value. In this way improved yields in respect to the melting point of the resins are obtained.

The resins prepared in accordance with the invention, which can have substantially greater melting points than the untreated precursor resin, for example melting point increments of 20° C. to 70° C. or more, are characterized by particularly good solvent release and high elasticity. In contradistinction to the unmodified ketone resins, they have the noteworthy property of being resistant to water. They are soluble in esters and ketones as well as in a mixture of these solvents with alcohols and aromatics. The resins are suitable for the production of nitrocellulose base lacquers and can be used as printing-ink resins, for instance for aniline-offset printing.

The following examples will serve further to explain the method of the invention:

*Example 1*

300 grams of a condensation product obtained from 270 grams of methylethylketone and 600 grams of 35 weight-percent aqueous formaldehyde solution by the method of German Patent 850, 232, Example 2, are heated for 8 hours at 200° C. with 28 grams of fumaric acid. In order to facilitate the emergence of the water, 18 grams of xylene are added. The acid number of the mixture drops from 90 to 25. The melting point of the ketone resin rises from 87 to 158° C. The solvent release of a solution of 25 grams of the reaction product in 25 grams xylene and 10 grams n-butanol, measured by

---

[1] Obtained by the method attributed to Krämer-Sarnow and described in "Hydrocarbon Oils and Fats," 7th edition, 1933, page 408.

the indirect method of Dr. Kraus, Collodium Nachrichten No. 6,[2] is 40.8% after 1 hour, while the initial resin, 25 grams of it being dissolved in 25 grams of xylene and 10 grams of n-butanol, shows a solvent release of only 6.3%.

*Example II*

300 grams of a ketone formaldehyde condensation product prepared in the manner described in Example I are heated for 8 hours at 200° C. with 6 grams of fumaric acid. 18 grams of xylene are added to improve the removal of the water. The melting point of the resin rises from 87 to 122° C.

*Example III*

15 grams of maleic anhydride are heated for 8 hours at 200° C. with 300 grams of a ketone-formaldehyde condensation product produced in the manner described in Example I, with the addition of 18 grams of xylene. The melting point of the ketone resin rises from 87° to 136° C.

*Example IV*

300 grams of a ketone resin prepared by condensation of one mol of acetone with 2.1 mols of formaldehyde in the presence of a 25% aqueous sodium hydroxide solution and having a melting range of 200–210° C. is heated under addition of 13.5 grams of citraconic acid to 220° C. till the acid number of the reaction mixture decreases to 18. The melting point of the ketone resin rises to 255° C.

*Example V*

To 250 grams of a ketone resin prepared by alkaline condensation of one mol of diethyl ketone, one mol of methylpropyl ketone and 5 mols of formaldehyde and having a melting range between 45 and 50° C., are added 20 grams of fumaric acid and 30 grams of toluene and heated to 195° C. for 10 hours. During this time, the acid number of the reaction product has decreased to 12.

---

[2] The solvent release method of Dr. Kraus is performed by preparing with a 100µ doctor blade a film and after permitting the same to dry for one hour ascertaining the swing hardness or inflexibility. The swing hardness or inflexibility as ascertaned after 24 hours of drying in air or 2 hours of dryng in an oven is established as equal to 100 and the value obtained after one hour air drying expressed in percent referred to such value. The film obtained from the lacquer of the composition described in Example 1 after one hour of air drying had a swing hardness or inflexibility of 33 and after 24 hours of air drying and 2 hours of oven drying at 100° C. a swing hardness or inflexibility of 81. The solvent release for such product may be calculated as follows:

$$\frac{81}{33} = \frac{100}{X} \therefore X = 40.8\%$$

Swing hardness or inflexibility has been defined in "Physical and Technological Test Processes for Lacquers and Their Raw Materials," Dr. Felix Wilborn, 2nd, vol. 1953, p. 480.

The melting point of the ketone resin rises by this operation to 95° C.

What is claimed is:

1. A synthetic resin consisting essentially of a reaction product of a member selected from the group consisting of fumaric acid, maleic acid, citraconic acid, mesaconic acid, itaconic acid, and their corresponding anhydrides, and a solid resin derived by condensation of formaldehyde and a saturated aliphatic ketone having 3–5 carbon atoms in the proportion of about 10% by weight of said group member based on the amount of said starting solid resin at a temperature of 165–220° C., said reaction product having a melting point substantially in excess of the melting point of said precursor resin.

2. A synthetic resin according to claim 1, wherein the starting solid resin is derived from methyl ethyl ketone and formaldehyde and the group member is fumaric acid.

3. The method of producing synthetic resins of high melting point, which comprises contacting a solid resin derived by condensation of a saturated aliphatic ketone having 3–5 carbon atoms and formaldehyde with an amount not exceeding about 10% by weight of said solid resin of a member selected from the group consisting of fumaric acid, maleic acid, citraconic acid, mesaconic acid, itaconic acid, and their corresponding anhydrides at a temperature of 160–250° C. for a time sufficient to react said solid resin and said group member and to form a solid synthetic resin of substantially higher melting point than the melting point of the starting solid resin.

4. The method of claim 3, wherein said contacting is carried out at a temperature of 200–220° C.

5. The method of claim 3, wherein said starting solid resin is derived by condensation of methyl ethyl ketone and formaldehyde.

6. The method of claim 3, wherein said contacting is carried out in the presence of a volatile organic liquid miscible with water, whereby removal of water during the reaction is facilitated.

7. The method of claim 3, wherein said solid resin is derived by condensation of a saturated aliphatic ketone having 3–5 carbon atoms and formaldehyde in the presence of an alkaline condensation agent and at a low temperature.

References Cited in the file of this patent

UNITED STATES PATENTS

| | | |
|---|---|---|
| 2,201,750 | Vierling et al. | May 21, 1940 |
| 2,571,089 | Harvey et al. | Oct. 16, 1951 |
| 2,590,911 | Wittcoff | Apr. 1, 1952 |
| 2,629,703 | Vogelsang | Feb. 24, 1953 |

OTHER REFERENCES

Hackh Chemical Dictionary, 3d ed. 1944, the Blakiston Co., Philadelphia, page 663.